UNITED STATES PATENT OFFICE.

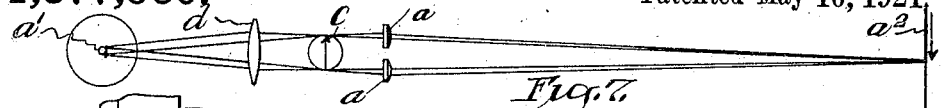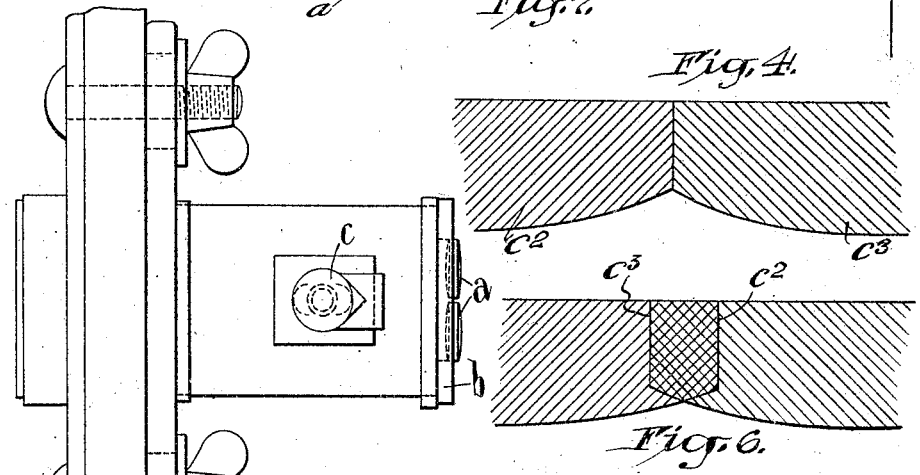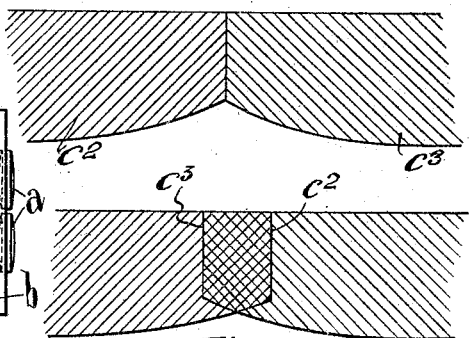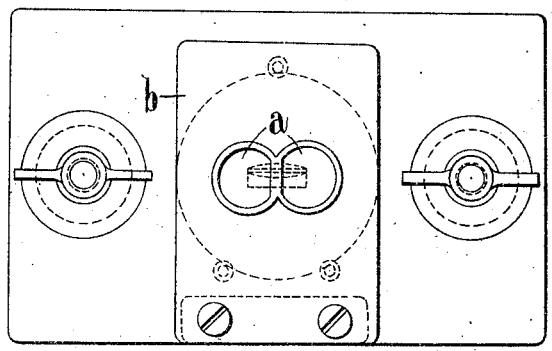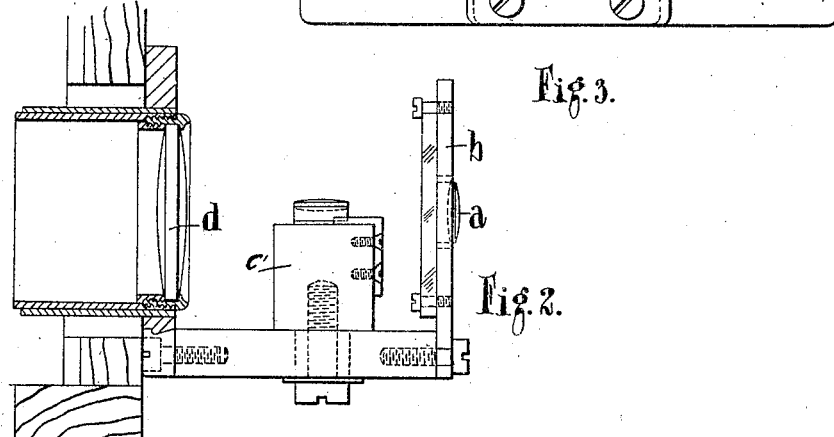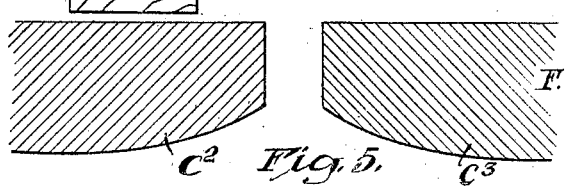

FRANK TWYMAN AND REGINALD PAGE WILSON, OF LONDON, ENGLAND, ASSIGNORS OF ONE-THIRD TO ADAM HILGER LIMITED, OF LONDON, ENGLAND.

OPTICAL GAGING APPARATUS.

1,377,530.  Specification of Letters Patent.  Patented May 10, 1921.

Application filed December 10, 1919. Serial No. 343,803.

*To all whom it may concern:*

Be it known that we, FRANK TWYMAN, a subject of the King of Great Britain and Ireland, and residing at 75ª Camden road, London, N. W. 1., England, and REGINALD PAGE WILSON, a subject of the King of Great Britain and Ireland, and residing at 58 Wynnstay Gardens, Kensington, London, W. 8., England, have invented certain new and useful Improvements in Optical Gaging Apparatus, of which the following is a specification.

This invention relates to optical gaging apparatus and consists in an optical gage adapted to gage the positions of a number of points or a number of series of points such for example as form lines.

More specifically the invention consists in a plurality of lenses or lens parts so positioned in relation to one another that, when used in conjunction with a standard comprising a plurality of points (corresponding to the number of lenses) to be positioned, the images of the points thrown upon a screen by projection will all be arranged substantially edge to edge superposed or otherwise positioned in relation to one another.

By means of such an apparatus it is thus a very simple and expeditious matter to obtain an accurate gage of a test piece or apparatus by noting the position upon the screen of the images of the points in the test piece as compared with the standard position.

The accompanying drawings illustrate one mode of carrying out the invention in its application to the gaging of a lens.

Figure 1 is a plan showing a part of the apparatus.

Fig. 2 is a side elevation partly in section, and

Fig. 3 is a plan.

Fig. 4 is a diagrammatic view illustrating the positions which the images projected by the lenses and representing the opposite side edges of a standard lens will occupy upon the screen.

Fig. 5 is a similar view showing the positions which the images, of the opposite side edges of a test lens, will occupy upon the screen when the diameter of the test lens is smaller than the diameter of the standard lens.

Fig. 6 is a similar view showing the positions when the diameter of the test lens is larger than the diameter of the standard lens.

Fig. 7 is a diagrammatical view illustrating the courses in which the light rays take from their source to the screen.

In carrying our invention into effect in one convenient manner, we provide any suitable source of illumination $a'$ preferably combined with a condenser $d$, and in conjunction therewith we provide a plurality of lenses $a$, the number of which will in general depend upon the number of points, the position of which is to be gaged.

As the apparatus illustrated is intended for gaging the diameter of a lens, two projecting lenses $a$ will be sufficient.

The projecting lenses $a$ may be cemented upon a glass plate $b$ or they may be otherwise fixed or removably mounted, and intermediate of the lenses $a$ and the condenser $d$ we provide a stand or mounting $c'$ adapted interchangeably to hold a standard such as $c$ or a test object of similar form to be gaged.

The parts are so arranged relative to one another that when the standard $c$ is inserted on the mounting $c'$, the images of the opposite side edges of the standard will be projected in superposed or edge to edge relation upon a screen $a^2$ or otherwise definitely positioned thereon in relation to one another.

In the example shown where the body to be gaged is a lens of cylindrical form, the lenses $a$ are so arranged that the images thrown upon the screen and representing the opposite side edges of the standard lens will be contiguous or coincident upon the screen as shown, for example, in Fig. 4.

When the standard lens $c$ is removed and the lens to be tested is placed upon the mounting $c'$ in exactly the same position as that previously occupied by the standard, the edges of the test lens will be projected upon the screen. If the diameter of the test lens agrees exactly with that of the standard, the images will appear as in Fig. 4 where the edges $c^2$ and $c^3$ are coincident, while if the diameter of the test lens be too small the edges $c^2$ and $c^3$ will be separated by a gap as shown in Fig. 5. If the diameter of the test lens be too large the images representing the opposite edges of the test lens will overlap as shown in Fig. 6.

In a further application the sides of a prism may be gaged, three lenses being adopted and so arranged that the images of the lines representing the sides of the standard will all intersect at one point on the screen.

It will be understood however that the invention is capable of very wide application and the number of lenses employed and the manner of arranging the same may be varied to suit any particular application. Moreover colored screens or other means may be adopted when required to identify on the screen any particular aperture or other point in the test piece being gaged.

Having now described our invention, what we claim as new and desire to secure by Letters Patent is:—

1. Optical projection apparatus of the kind referred to for use in gaging comprising a plurality of lenses or lens parts, a source of illumination, a condenser in association therewith, means intermediate of the lenses and condenser for interchangeably holding a test piece or standard and an object of similar form to be gaged, and a screen onto which the images produced by the lenses may be projected.

2. Optical projection apparatus of the kind referred to for use in gaging, comprising two lenses carried by a transparent support, a source of illumination, a condenser in association therewith, a support intermediate of the condenser and lenses upon which a standard and an object of similar form to be gaged may be interchangeably mounted, a screen onto which the images produced by the lenses may be projected.

In testimony whereof we have signed our names to this specification.

FRANK TWYMAN.
REGINALD PAGE WILSON.